Oct. 8, 1929.  N. A. SCHASSBERGER  1,730,787
WINDSHIELD REGULATOR
Filed Jan. 18, 1928
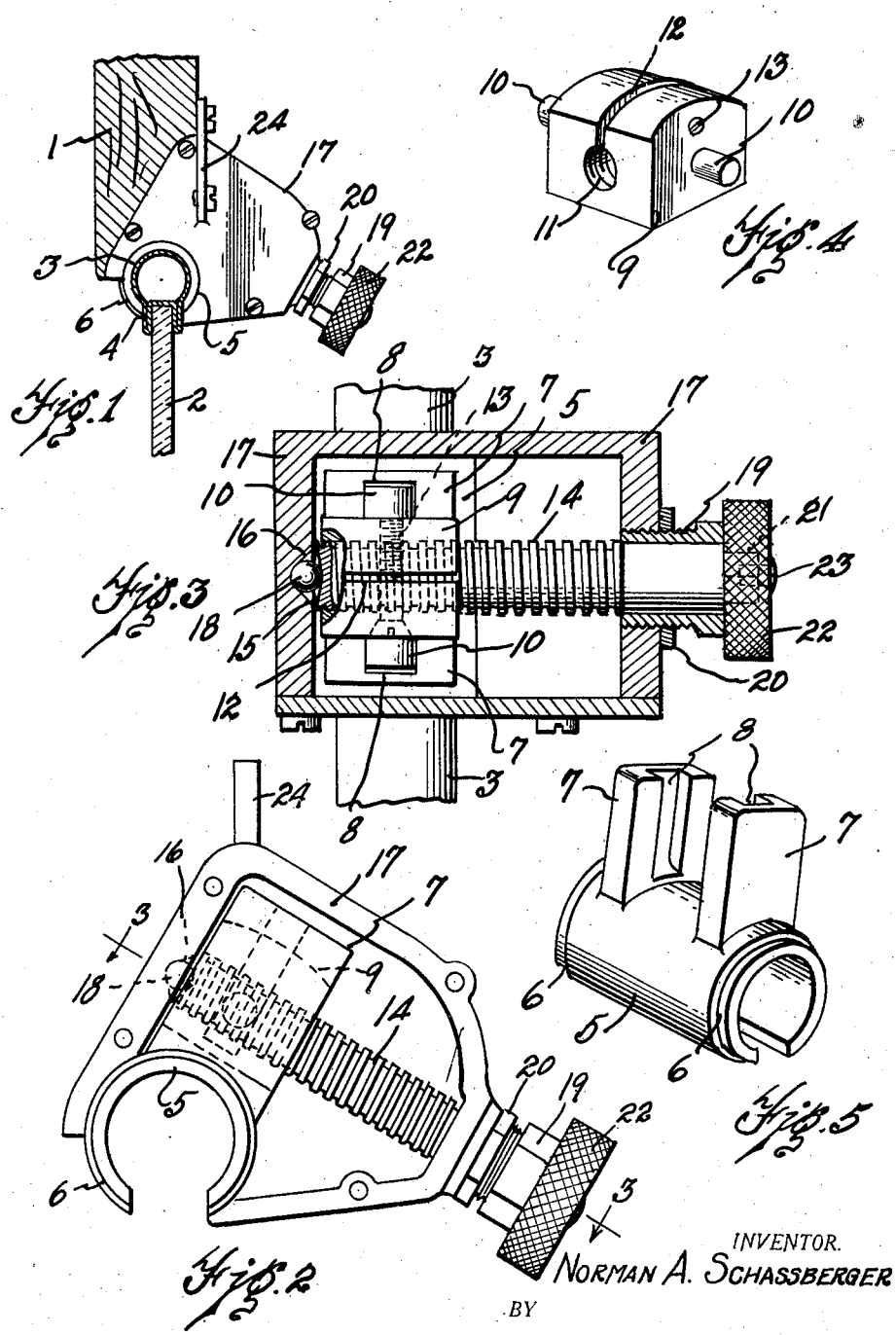
INVENTOR.
Norman A. Schassberger
BY
ATTORNEY.

Patented Oct. 8, 1929

1,730,787

UNITED STATES PATENT OFFICE

NORMAN A. SCHASSBERGER, OF DETROIT, MICHIGAN, ASSIGNOR TO ACKERMAN-BLAESSER-FEZZEY, INC., OF DETROIT, MICHIGAN, A CORPORATION OF MICHIGAN

WINDSHIELD REGULATOR

Application filed January 18, 1928. Serial No. 247,516.

This invention relates to windshield regulators and the object of the invention is to provide a device for turning a pivoted windshield to open or closed position.

Another object of the invention is to provide a windshield regulator particularly adapted for use in closed automobile bodies, the device being manually operable from the interior of the body to turn the windshield on its pivot.

A further object of the invention is to provide a device of the character described which will rigidly hold the windshield in any position to which it is turned.

Another object of the invention is to provide a windshield regulator adapted to turn the windshield outwardly and in which the leverage applied to the windshield is increased as the windshield moves outwardly.

These objects and the several novel features of the invention are hereinafter more fully described and claimed and the preferred form of construction by which these objects are attained is shown in the accompanying drawings in which—

Fig. 1 is a sectional view through the windshield showing the regulator as utilized therewith.

Fig. 2 is an enlarged view of the regulator with the end plate removed.

Fig. 3 is a section taken on line 3—3 of Fig. 2.

Fig. 4 is a perspective view of the traveling nut which operates the windshield.

Fig. 5 is a perspective view of the member which the traveling nut actuates.

In the usual closed body construction a frame member 1 extends across the body at the front just above the windshield. The windshield is usually pivotally mounted just below the frame member 1 and comprising a windshield glass 2, shown in Fig. 1, and a channel or windshield frame member 3 which is formed of steel and provided with a channel 4 for the windshield glass. The member 5, shown in Fig. 5, engages over the channel or windshield frame 3 and is provided with a circumferentially recessed shoulder 6 at each end. The end plates of the housing engage in these circumferential recesses and provide supports in which the member 5 is journaled. The member 5 is provided with two upwardly extending lugs 7 each having a channel 8 therein. A nut 9, as shown in Fig. 4, engages between the lugs 7 and is provided with trunnions 10 which engage in the channels 8 as shown in Figs. 2 and 3 and the nut 9 is provided with a threaded aperture 11 therethrough. The nut is also provided with a slot 12 opening into the threaded aperture 11 and a screw 13 shown more particularly in Fig. 3, extends through the nut and provides a means for adjusting the nut for looseness or tightness on the threaded shaft 14. The shaft 14 is provided with a recessed end 15 and a recess 16 is provided in the housing 17 in which the ball 18 seats. This provides a support for one end of the shaft 14. At the opposite end the shaft 14 is supported in a sleeve 14 which is threaded into the housing 17 and engages against a shoulder provided therefor on the shaft. This holds the shaft in position in the housing with the end of the shaft engaging the ball 18 as shown and by this arrangement the shaft is rotatably supported in the housing and is prevented from longitudinal movement. A lock nut 20 is threaded on the sleeve 19 and secures the member 19 from displacement in the housing 17. The end of the shaft 14 extends through the sleeve 19 and is provided with a squared end 21 shown in Fig. 3 and a knurled head 22 is secured to the shaft by means of a screw 23 which is threaded into the squared end 21 of the shaft. While I have shown a knurled head secured to the end of the shaft 14 a crank may be secured to the end of the shaft if desired.

The windshield is normally in the closed position shown in Fig. 1 and the window regulator is secured to the frame 1 by means of an integral plate or plates 24 through which screws are inserted into the frame 1. When the windshield is in the closed position the regulator parts are in the position shown in Fig. 2. If the operator wishes to open the windshield he grasps the knurled head 22 and by means of the knurled head turns the shaft 14 to move the nut 9 downwardly toward the knurled head 22. This movement of the nut by means of the trunnions 10 and the channels 8 in the lugs 7 turns the member 5 in the housing thus turning the windshield outwardly. It will be noted that the windshield is firmly supported in any position to which it is turned and as the nut 9 moves downwardly toward the knurled head 22 the trunnions 10 move toward the top of the channels 8 in the lugs 7 thus increasing the leverage as the windshield is turned outwardly to more firmly support the weight of the windshield. This device is adapted particularly for use with one piece windshields which are hinged at the top but is also adapted for use on the upper section of a windshield which is divided horizontally. By rotating the knurled head 22 in the opposite direction the windshield may be readily returned to the closed position and a crank may be used in place of the knurled head 22 if desired to increase the ease and speed of manipulation.

From the foregoing description it becomes evident that the device is very simple and efficient in operation, will not easily get out of order, is composed of few parts to insure simplicity of operation, and provides a device which accomplishes the objects described.

Having thus fully described my invention, its utility and mode of operation, what I claim and desire to secure by Letters Patent of the United States is—

1. A windshield regulator including a frame in which the windshield is pivoted, comprising a housing secured to the frame, a member journaled in the housing and secured to the windshield, the said member being provided with a pair of lugs each having a way therein, a nut fitting between the lugs and having trunnions riding in the said ways, a shaft rotatably mounted in the housing and extending in a plane at a right angle to the said journaled member, the shaft being threaded to receive the nut, and manually operable means for rotating the shaft.

2. A regulator for pivoted windshields having a frame in which the windshield is pivoted, comprising a housing secured to the frame, a member pivotally mounted in the housing and secured to the windshield, a threaded shaft manually rotatable in the housing, a nut threaded onto the shaft and movable longitudinally of the shaft as the shaft is rotated, a pair of trunnions on the nut and a pair of lugs on the pivoted member provided with ways in which the said trunnions are adapted to ride.

3. A windshield regulator including a frame in which the windshield is pivoted, comprising a housing secured to the frame, a member pivotally mounted in the housing and secured to the windshield, the said member being provided with a pair of ways, a nut having trunnions riding in the said ways and a threaded shaft manually rotatable in the housing and on which the nut is threaded.

In testimony whereof I sign this specification.

NORMAN A. SCHASSBERGER.